Nov. 5, 1963  A. K. SIMONS ETAL  3,109,621
SPRING SUSPENSION FOR SEATS
Filed Oct. 6, 1960  4 Sheets-Sheet 2
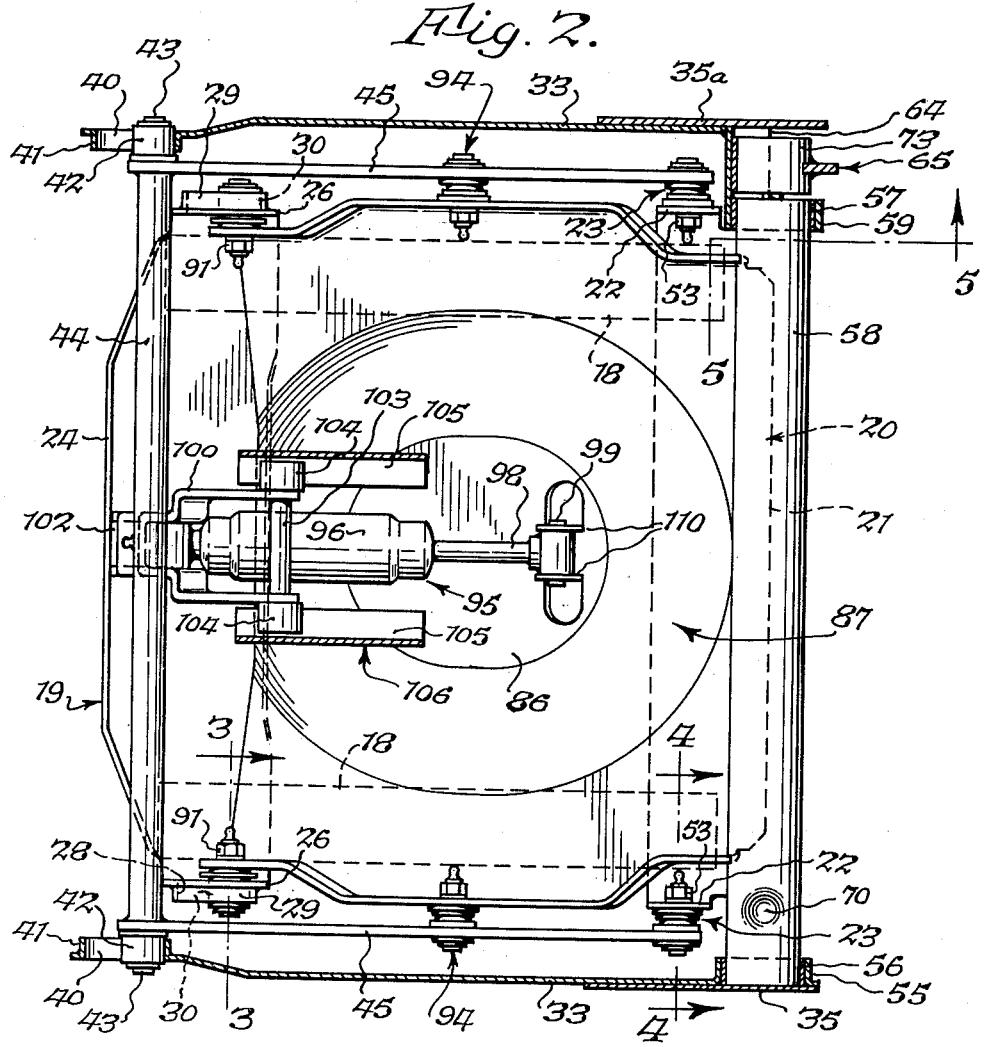
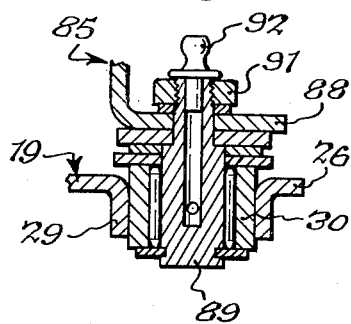
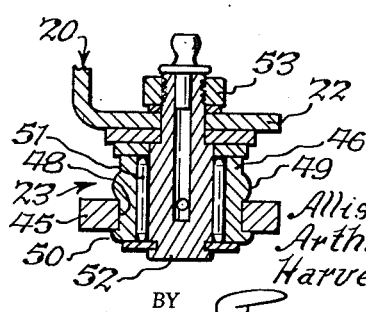
INVENTORS
Allison K. Simons
Arthur O. Radke
Harvey N. Tengler
BY Popp and Sommer
ATTORNEYS

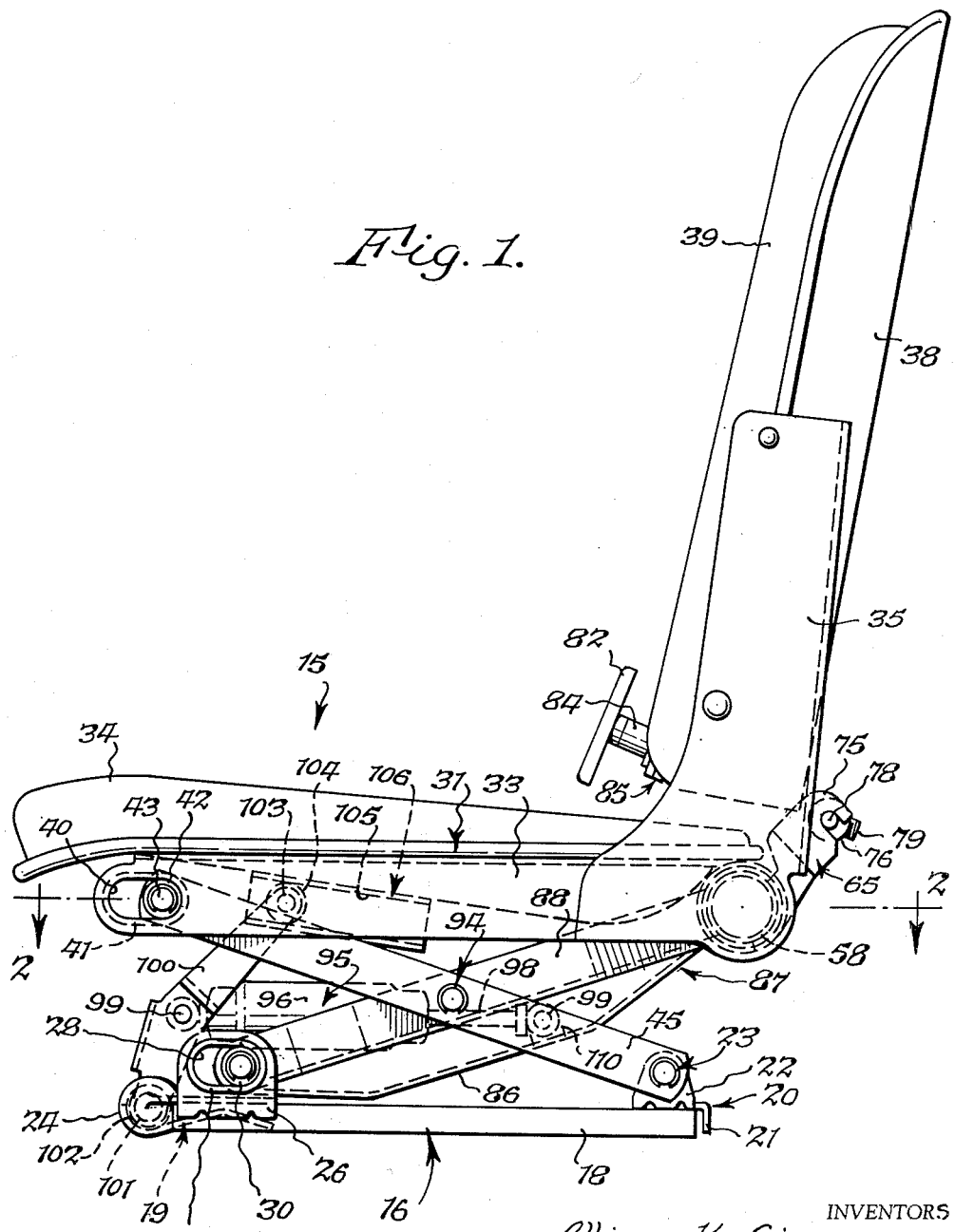

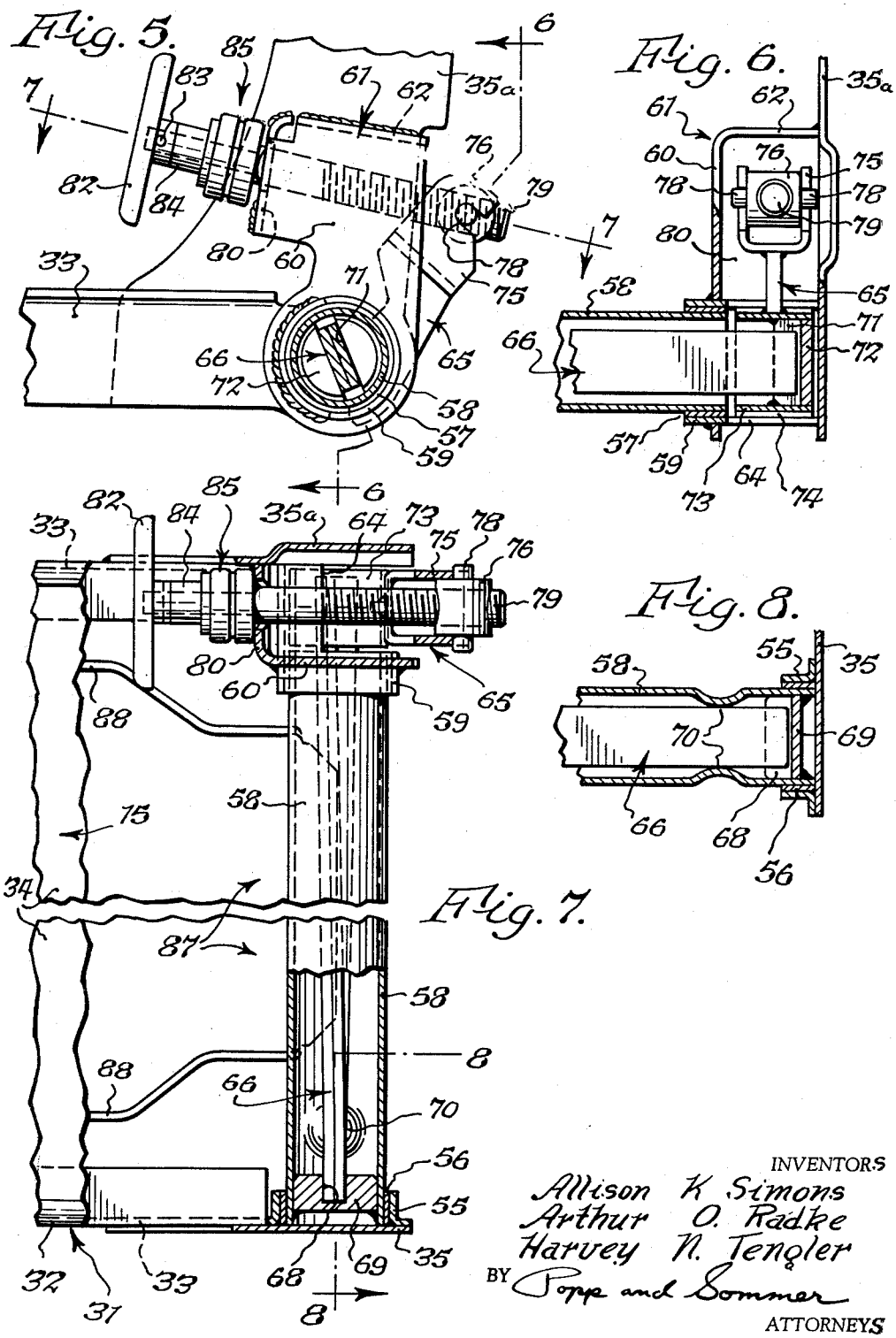

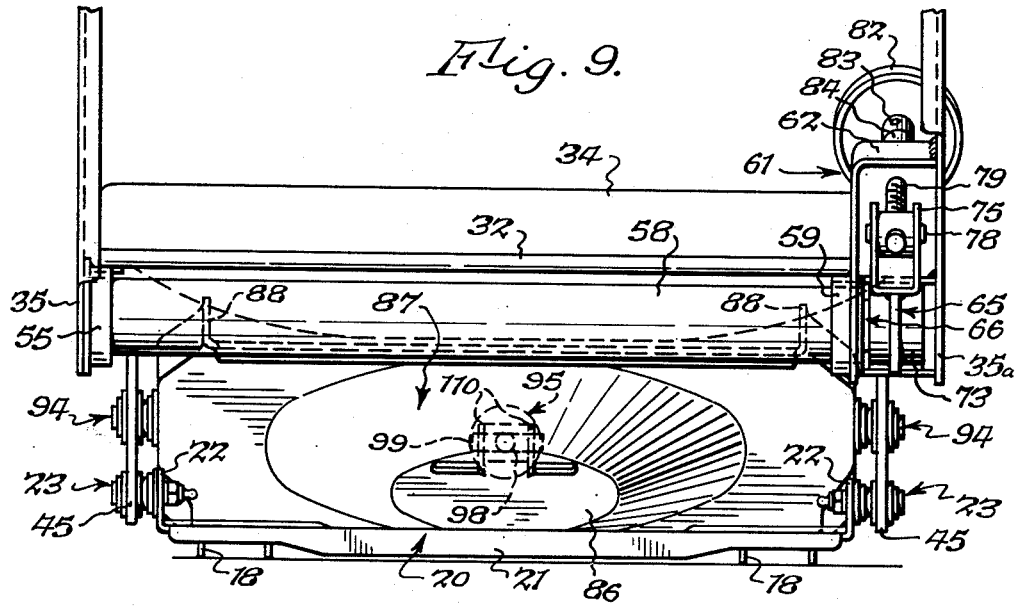
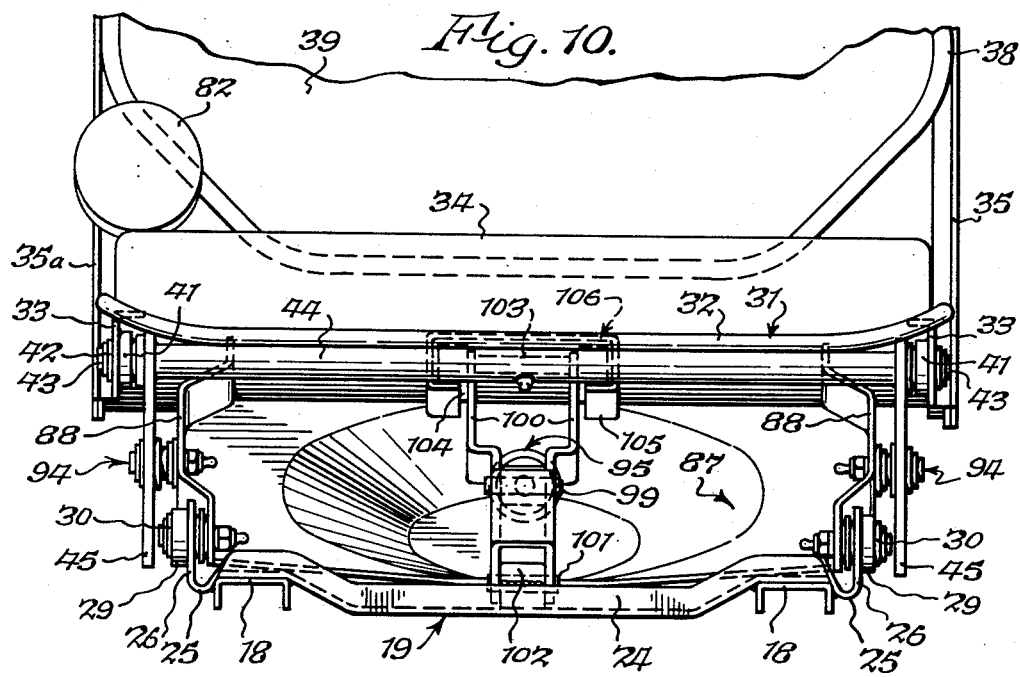

United States Patent Office 3,109,621
Patented Nov. 5, 1963

3,109,621
SPRING SUSPENSION FOR SEATS
Allison K. Simons, Arthur O. Radke, and Harvey N. Tengler, Milwaukee, Wis., assignors to Bostrom Corporation, Milwaukee, Wis., a corporation of Wisconsin
Filed Oct. 6, 1960, Ser. No. 60,962
5 Claims. (Cl. 248—399)

This invention relates to a spring suspension for seats and more particularly for a seat structure which can be used both with extremely rough-riding vehicles such as farm tractors and military vehicles and also with highway trucks.

This application is an improvement upon the Resilient Seat Structure described and claimed in the Hickman application, Serial No. 715,368 filed February 14, 1958, now Patent No. 3,036,805.

The design of a seat for rough-riding off-the-road vehicles, such as farm tractors, presents special problems in order to permit the maximum speed over rough terrain without loss of full control of the vehicle and with maximum riding comfort. Among these problems is the provision of a suspension sturdy enough to withstand the violent impacts in all directions to which the suspension is subjected while at the same time having positive control of the direction of movement of the seat and a resilient resistance of proper frequency to give, within the permitted limits of seat movement, a ride having the maximum comfort. Fore-and-aft tipping or rocking of the seat as well as lateral listing or lurching of the seat must also be avoided to insure the driver remaining in control of the tractor. All of this must also be accomplished within limited space conditions.

The design of a seat for a highway truck cab presents special problems not encountered in passenger vehicles. The main springs for trucks are necessarily strong enough to carry heavy loads and therefore when the trucks are only partly loaded, or completely unloaded, the spring frequencies are considerably above 100 cycles per minute which causes a very uncomfortable and fatiguing ride unless the driver and the riders are protected by comfortable and practicable seating equipment. If conventional cushions having soft internal springs are used the bottom cushions are subjected to an excessive amount of action which soon breaks the bottom cushion materials and requires repair and replacement thereof. Further, such excessive action of the bottom cushion is necessarily accompanied by an excessive amount of movement between the back of the occupant and the back cushion. This is very uncomfortable and causes excessive clothing as well as back cushion wear. Also, as with tractor seats, fore-and-aft tipping, rocking or lateral listing or lurching of the seat must be prevented and the designer of truck seats is always confronted with severe space limitations.

In common with the said Hickman application, general objects of the present invention are to provide a seat structure, (1) which provides the maximum safety and comfort and leaves the occupant in full control of all controls of the vehicle; (2) in which the seat moves with the occupant and is not drawn or jerked away from the occupant whenever the pressure imposed by the occupant upon the seat becomes negative; (3) which will operate in a highly desirable frequency range regardless of the weight of the occupant, the condition of the terrain or the weight of the load carried; (4) which can be designed, within practicable limits, to have any desired frequency and any desired resistance curve; (5) in which torsion springs are employed to provide a longer and a variable spring resistance range; (6) in which the resilient support is provided by torsion springs which are simple, compact, low in cost and have long life and freedom from service difficulties; (7) in which the resilient resistance is obtained in a compact structure which requires little servicing and is free from noise; (8) in which the load from the seat part to the spring suspension and from the spring suspension to the base part is distributed at a plurality of widely spaced points; (9) in which both fore-and-aft tipping or rocking and lateral listing or lurching of the seat is prevented; (10) which is made of a plurality of low-cost and sturdy sub-assemblies which can be easily coupled together; (11) which is readily adjusted to suit the weight of the driver; (12) which is extremely compact and sturdy and which will stand up under conditions of severe and constant use with very little servicing; (13) which has simple rock arms of long effective length interconnected with one another and with the base and seat parts to prevent such rocking or lurching and provide a stable ride; (14) in which the rock arms provide maximum strength with minimum weight and cost; (15) in which the resilient support is provided by a straight torsion bar or bars; (16) has little friction and which is light in weight; (17) in which the stress on the torsion bars can be kept low; and (18) which has a low frequency in the order of 65–75 cycles per second.

An important specific object of the present invention is to provide such torsion bar seat suspension in which a single torsion bar structure can be used and which is of such short length as to be completely housed within the space under the seat part of the seat structure.

Another specific object is to provide such a torsion bar seat suspension which is of simple and inexpensive construction and might be made competitive in price and quality with standard spring cushions and other seat structures now in use.

Another object is to provide a simple and effective adjustment for the degree of pretension or wind-up of the torsion bars to suit the weight of the occupant of the seat part of the seat structure.

Another object is to provide such a torsion bar seat suspension having rock arms of such length as to require them to be arranged in criss-cross relation and in which the use of shackles is avoided.

Another object of the invention is to provide such rock arms which are made of sheet metal and in which one is in the form of a simple low cost sheet metal pan, the rims of which provide the rock arms.

Another important object is to provide a seat structure including a shock absorber which nests within the small space provided between the base part and seat part of the seat structure.

Other objects and advantages of the invention will be apparent from the following description and drawings in which:

FIG. 1 is a side elevational view of a seat structure having a torsion bar spring suspension embodying the present invention and showing the position which the parts assume when the seat is unoccupied.

FIG. 2 is a fragmentary, horizontal sectional view taken generally on line 2—2, FIG. 1.

FIGS. 3 and 4 are enlarged, fragmentary, vertical, sectional views taken generally on the correspondingly numbered lines in FIG. 2.

FIG. 5 is an enlarged, fragmentary, vertical, sectional view taken generally on line 5—5, FIG. 2.

FIG. 6 is a fragmentary, vertical, sectional view taken generally on line 6—6 of FIG. 5.

FIG. 7 is a fragmentary, horizontal, sectional view taken generally on line 7—7 of FIG. 5.

FIG. 8 is a fragmentary, vertical, sectional view taken generally on line 8—8, FIG. 6.

FIG. 9 is a fragmentary, rear elevational view.

FIG. 10 is a fragmentary, front elevational view.

The spring suspension of the present invention resiliently supports a seat part, indicated generally at 15, and which is generally rectangular in plan, upon a base part indicated generally at 16 and which is also generally rectangular in plan. While this base part can be of any suitable construction, it is shown as comprising a pair of transversely spaced fore-and-aft side bars 18 connected at their front ends by a front cross bar 19 and at their rear ends by a rear cross bar 20. The fore-and-aft side bars of the base part 16 are in the form of simple channels with their flanges projecting downwardly but the front and rear cross bars 19 and 20 are in the form of stampings which are also designed to provide corner bearing support for the rock arms at each of the four corners of the seat suspension as hereinafter described. Thus, the rear cross bar 20 is strengthened by a downwardly extending rear flange 21 and has upstanding ears 22 at its opposite ends each forming a support for a fulcrum bearing indicated generally at 23 and shown in section in FIG. 4, the bearings 23 being coaxial. The front cross bar 19 has a front upstanding flange 24 and is formed at each end with a downwardly projecting return bend 25 which is arranged alongside the corresponding fore-and-aft channel 18 and terminates in an upstanding ear 26. Each end ear 26 is provided with a horizontal elongated hole 28 which is surrounded by a track 29 of corresponding shape. Each hole 28 and its track 29 is horizontally elongated in a fore-and-aft direction and is semi-circular at each end and contains a roller 30 of the seat suspension as hereinafter described.

The seat part 15 of the seat structure can be of any suitable construction and is shown as comprising a horizontal sheet metal seat pan 31 having a beaded edge 32 and having welded to its opposite sides depending fore-and-aft side panels 33. A seat cushion 34 can be suitably mounted on the seat pan 31 and a pair of side or rear corner plates 35, 35a are shown as secured to and rising from the rear ends of the side panels 33 as best shown in FIGS. 1 and 2. These side plates 35, 35a are shown as supporting a sheet metal back panel 38 the front of which can be upholstered with a back cushion 39.

The front end of each depending side panel 33 of the seat part 15 is shown as provided with a horizontally elongated hole 40 surrounded by a fore-and-aft track 41 which projects toward the center of the seat structure as best shown in FIG. 2. The cross rod 43 is common to both rollers 42 and can form apart of or be contained within a cross bar or tube 44 to the ends of which rock arms 45 are rigidly secured. These rock arms and their rigid cross bar are arranged in the same plane and form a yoke member and the rear ends of said arms are journalled through the bearings 23 on the upstanding ears 22 at the opposite ends of the rear cross bar 20 of the base part 16 of the seat structure.

While this bearing 23 between the rear end of each rock arm and the upstanding ears 22 at the rear corners of the base part 16 can be of any suitable construction, each bearing 23 is shown in detail in FIG. 4 as comprising an outer tubular race 46 held within an opening 48 at the rear end of the corresponding rock arm 45 by means of outward enlargements 49 and 50 of the outer race and containing rollers 51 rotatably supporting a stem 52 projecting from the corresponding ear 22 and secured thereto by means of a nut 53. Suitable washers are provided, as shown in FIG. 4, to hold the parts in proper position and the bearing can be oiled through a conventional oil nipple as shown.

As best shown in FIG. 7 to the inner face of the left-hand rear corner side plate 35 of the seat part 15 is welded a bearing sleeve 55 which projects horizontally toward the center of the seat structure and contains a bearing bushing 56. In this bearing bushing is journalled the end of a cylindrical tube 58, the opposite end of which is journalled in a bearing bushing 57 contained in a bearing sleeve 59 welded in one side to the corner plate 35a rising from the right-hand rear corner of the seat part 15 of the seat structure. The bearing sleeve 59 projects within a bracket 61 into engagement with the corresponding corner plate 35a and is welded to this plate 35a as well as to the rear end of the corresponding side panel 33 of the seat part 15 as best shown in FIG. 2. However, within the bracket 61, as best shown in FIGS. 2, 6 and 7, the rear half of the bearing sleeve 59 is cutaway, as indicated at 64, this cutaway being for the purpose of accommodating a lever, indicated generally at 65, for adjusting the degree of pretensioning or windup of the seat as hereinafter described. The bracket 61 has a top flange 62 and a vertical side flange 60.

An important feature of the invention resides in the use of a single metal torsion bar indicated generally at 66, for providing the resilient support for the seat part 15 upon the base part 16. This torsion bar is shown as being in the form of two rectangular bars arranged in face-to-face relation with each other and housed within the tube 58. The live end of the torsion bar 66 is shown as arranged in a diametral slot 68 provided in a cylindrical plug 69 welded in the end of the fulcrum tube 58 opposite from the bracket 61 as best shown in FIGS. 7 and 8. The torsion bar 66 is held centered in this tube by means of teats or offsets 70 in the fulcrum tube 58 as best shown in FIG. 8.

The opposite dead or anchored end of the torsion bar 66 is journalled in a cross slot 71 in a cylindrical plug 72 secured in a short coupling sleeve 73. This sleeve is journalled by means of a half bearing bushing 74 in the cutaway portion of the bearing sleeve 59 and to this short coupling sleeve 73 is welded the inboard or fulcrumed end of the pretensioning adjusting lever 65.

The movement of this adjusting lever 65 is accommodated by the cutaway rear half 64 of the bearing sleeve 59, and its outer end is bifurcated by the provision of a U-shaped yoke 75 welded to its outer or free end. A nut 76 is arranged between the arms of this yoke and is provided with pivot pin extensions 78 which are journalled in this yoke 75 so that the nut 76 turns about an axis parallel with the axis of the tube 58.

An adjusting screw 79 is screwed into the nut 76 and extends through a front vertical wall 80 of the bracket 61. An adjusting wheel 82 is fixed to the forward end of the screw 79, as by a cross pin 83, and a spacing sleeve 84 is interposed between the hub of the wheel 82 and a thrust bearing 85. This thrust bearing bears against the forward side of the vertical wall 80 of the bracket 61.

To the fulcrum tube 58 is welded the rear end of a sheet metal rock arm pan indicated generally at 85. This rock arm pan is made of sheet metal and has a downwardly dished center portion 86 to accommodate a shock absorber for the suspension, as hereinafter described, and also has upstanding side flanges 88 which extend fore-and-aft and which, in effect, form a pair of side rock arms connected by the bottom of the pan. The forward ends of these side flanges or rock arms 88 of the rock pan 87 carry outwardly projecting pins 89 which are in a common horizontal axis extending transversely of the seat structure and severally carry the rollers 30 which as previously explained ride in the horizontally elongated track 29 on the upstanding ears 26 of the front cross bar 19 of the base part 16. Thus, the rock arms 88 and the pintles 89 connected by the pan 85 form in effect a yoke member. From FIG. 2 it will be noted that these rollers 30 are each journalled on the pin 89 in much the same manner as the bearing 23 at the rear ends of the rock arms 45. Thus roller bearings 90 are interposed between each roller 30 and its pin 89 with the pin held in place by a nut 91 and with suitable washers provided to operatively space the parts, a lubricating nipple 92 also being provided. The spaced rock arms 88 provided by the side flanges of the pan 87 are pivotally connected at their centers to the rock arms 45 by bearings indicated generally at 94. These bearings can be of any suitable form but preferably are of the same form as the other bearings for these rock arms as illustrated in FIGS. 3 and 4. A detailed description of these bearings is not repeated.

An important feature of the invention resides in the construction and mounting for the shock absorber used to control the action of the seat.

The shock absorber, indicated generally at 95, is of the telescoping cylinder and piston type, the cylinder being indicated at 96 and the piston rod at 98. The cylinder 96 is connected by a pivot pin 99 with the central part of a lever arm 100, the lower end of which is journalled on a pivot pin 101 carried by the front cross bar 24 of the base part 16 of the seat structure. This pivot pin is shown as held by a bearing sleeve 102 welded to the center of this cross bar 24 of the base part 16 and its axis, as with the axis of the pivot pin 99, is parallel with the axes of the rock arms 45 and 88.

The lever arm 100 is bifurcated and its outer broadened end carries a pivot pin 103. The outer ends of this pivot pin 103 carry a pair of rollers 104 which ride in side tracks 105 provided in a bracket 106 secured, as by welding, to the underside of the seat pan 31 of the seat part 15. The tracks 105 for the rollers 104 extend fore-and-aft with reference to the occupant of the seat and in the fully elevated position of the seat part 15, as illustrated in FIG. 1, the lever arm 100 inclines upwardly and rearwardly with reference to the true vertical so that downward pressure upon the seat part 15 tends to move the rollers 104 and upper end of the lever arm 100 rearwardly along the tracks 105, the fore-and-aft movement of this lever arm 100 being under control of the shock absorber 96.

Assuming the unloaded position of the seat structure as illustrated in the drawings, in the operation of the suspension the weight of the occupant will depress the seat pan 31 of the seat part 15 of the seat structure to a lower position and thereafter upward movement of the tractor, through the base part 16 and pivots 23 and 30, moves the rock arms 45 and 88 upwardly. Since the movement of the upper ends of these rock arms is resisted by the weight of the occupant, this upward movement of the lower pivoted ends of these rock arms causes them to rotate about their pivots 94 and also causes rotation of the tube 58 fast to the upper end of the pan 85 and its pair of rock arms 88. In this connection, because of the criss-cross relation of the pair of rock arms 45, 88 at each side of the seat structure, these rock arms fold together or tend to collapse downwardly, this movement of these levers being permitted by the slot and roller connections 40, 42 and 28, 30 interposed between the forward ends of these rock levers and the seat part 15 and base part 16, respectively.

The oscillation of the tube 58 is resisted by the torsion bar 66. Thus, referring to FIG. 7, this rotation of the tube 58, through the transverse slot 68 in the plug 69, rotates the live end of the torsion bar 66, this being its lower end as viewed in FIG. 7. The opposite end of this torsion bar 66 is held immobile with reference to the seat part of the seat structure and hence the torsion bar 66 yieldingly supports the occupant of the seat and provides the required resilient resistance. It will be noted that since the rock arms 88 extend from the front to the rear of the seat structure they are of long length so that a short and sturdy torsion bar 66 can be used, the long rock arms 88 permitting maximum downward movement of the seat part 16 with relatively small angular movement or twist of the torsion bar 66.

For heavier drivers it is desirable to have a greater degree of wind-up in the torsion bar 66. To increase or decrease this amount of pretensioning or wind-up, the occupant turns the hand wheel 82 in a corresponding direction. This turns the screw 79 which is held against axial movement by the thrust bearing 85 and hence moves the nut 76 along the screw. This movement of the nut rotates the adjusting lever 65 in a corresponding direction thereby to turn the short coupling sleeve 73 in its half bearing 74. Since this coupling sleeve 73 is coupled to the anchored or dead end of the torsion bar 66, this adjustment serves to pretension this torsion bar to the degree required for the particular weight of occupant.

As the vehicle on which the seat structure is mounted moves along the highway it is subject to vertical impacts both up and down, this causing the criss-cross lever arms 45, 88 at opposite sides of the seat structure to fold and unfold and work the torsion bar 66 as above described. This action is under control of the shock absorber 95, which it will be noted, is horizontally disposed and is nested between the seat part 15 and the base part 16. This shock absorber is of the simple telescoping cylinder and piston type with its piston rod 98 pivotally connected by pivot pin 99 and the upstanding ears 110, to the pan 87 connecting the lever arms 88 and its cylinder part connected with the central part of the lever arm 100. The lower end of this lever arm is pivoted to the base part 16 and its upper end has the rollers 104 riding along the fore-and-aft tracks 105 fixed to the underside of the seat part 15. Since this lever arm 100 is at all times angularly disposed with reference to the true vertical, the up and down movement of the seat part 15 with reference to the base part 16 causes fore-and-aft movement of the lever arm 100, this being under control of the shock absorber 95 which works in a horizontal fore-and-aft direction. In this action the rollers 104 at the upper end of this rock arm 100 ride back and forth along the tracks 105.

Lateral listing or lurching of the seat part 15 of the seat structure is prevented by the rock arm pivots at each of the four corners of the generally rectangular seat structure 15 and by the rigid connection of each of these rock arms 45, 88 with a companion rock arm at the opposite side of the seat. Thus, the rock arms 88 are formed integrally with and are interconnected by the seat pan 87 so that downward movement of either of the rear corners of the seat part 15 relative to the opposite rear corner is prevented. Similarly, the rock arms 45 are rigidly connected together by the tube 44 so the downward movement of either of the front corners of the seat part 15 relative to the other front seat corner is prevented. Also, since rock arms 45, 88 are connected together at each side of the seat structure by the pivots 94, downward movement of any front corner of the seat part 15 relative to the back corner at the same side of the seat structure is prevented. Accordingly, all parts of four corners of the seat part 15 are connected to move vertically in unison and lateral listing or lurching or fore-and-aft tipping or rocking of the seat part 15 is positively prevented. This leaves the occupant in full control of all the operating levers of the vehicle. At the same time the seat part 15 has the required controlled vertical resilience to permit use of the seat structure on rapidly moving rough-riding off the road vehicles as well as to provide a seat of the required frequency and action for use in highway trucks and tractors.

From the foregoing it will be seen that the present invention provides a seat structure accomplishing the various general and specific objects set forth, particularly in providing a low cost seat suspension supported by a single torsion bar structure and holding the seat part against lurching or rocking either laterally or fore-and-aft while at the same time providing the required controlled vertical resilience. It will also be seen that a shock absorber control can be provided without increasing the space required for the seat, the shock absorber acting horizontally and nesting among the parts when the seat part is fully depressed.

What is claimed is:

1. A spring suspension for resiliently supporting a seat part upon a base part, comprising a first pair of transversely spaced, generally parallel rock arms, first pivot means adjacent to one end of each of said arms pivotally connecting corresponding ends of said first pair of rock arms to one of said parts to swing about a first generally horizontal axis at one side of the spring suspension, which axis is fixed with reference to said one of said parts and to said first pair of rock arms, means adjacent to corresponding opposite ends of each of said arms rigidly connecting said first pair of rock arms together to maintain them in the same plane and to swing in unison about said first axis, bearing means at said connected ends of said first rock arms mounted for movement along a track on the other of said parts and which is horizontally elongated in the direction of its rock arm, a second pair of transversely generally parallel rock arms arranged in criss-cross relation to said first pair of rock arms, second pivot means pivotally connecting said first and second pairs of rock arms at their points of cross-over along a second axis generally parallel with said first axis, said second axis being fixed with reference to said first and second pairs of rock arms, third pivot means adjacent to one end of each of said arms of said second pair of arms pivotally connecting corresponding ends of said second pair of rock arms to said other of said parts to swing about a third axis at said one side of said spring suspension generally parallel with said first axis, said third axis being fixed with reference to said other of said parts and to said second pair of rock arms, means adjacent to the opposite end of each of said arms of said second pair of arms rigidly connecting said second pair of rock arms together to maintain them in the same plane and to swing in unison about said third axis, bearing means at the other end of each of said second rock arms mounted for movement along a track on said one of said parts and which is horizontally elongated in the direction of its rock arm, said means rigidly connecting the rock arms of one of the respective pairs of rock arms comprising a tube concentric with one of the axes thereof and a sheet metal pan connected to said tube and said rock arms of said one pair, and means arranged to resiliently resist movement of said seat part toward said base part, said seat and base parts being thereby linked together at each side independently of said tracks by said first and second pairs of rock arms through said first, second and third pivot means and which, in combination with the means rigidly connecting together each pair of rock arms at the track supported ends thereof, insures both fore-and-aft and lateral stability of the seat part and also maintaining the same horizontal position of the seat part as it moves vertically toward and from said base part.

2. A spring suspension for resiliently supporting a seat part upon a base part, comprising a first pair of transversely spaced, generally parallel rock arms, first pivot means adjacent to one end of each of said arms pivotally connecting corresponding ends of said first pair of rock arms to one of said parts to swing about a first generally horizontal axis at one side of the spring suspension, which axis is fixed with reference to said one of said parts and to said first pair of rock arms, means adjacent to corresponding opposite ends of each of said arms rigidly connecting said first pair of rock arms together to maintain them in the same plane and to swing in unison about said first axis, bearing means at said connected ends of said first rock arms mounted for movement along a track on the other of said parts and which is horizontally elongated in the direction of its rock arm, a second pair of transversely generaly parallel rock arms arranged in criss-cross relation to said first pair of rock arms, second pivot means pivotally connecting said first and second pairs of rock arms at their points of cross over along a second axis generally parallel with said first axis, said second axis benig fixed with reference to said first and second pairs of rock arms, third pivot means adjacent to one end of each of said arms of said second pair of arms pivotally connecting corresponding ends of said second pair of rock arms to said other of said parts to swing about a third axis at said one side of said spring suspension generally parallel with said first axis, said third axis being fixed with reference to said other of said parts and to said second pair of rock arms, means adjacent to the opposite end of each of said arms of said second pair of arms rigidly connecting said second pair of rock arms together to maintain them in the same plane and to swing in unison about said third axis, bearing means at the other end of each of said second rock arms mounted for movement along a track on said one of said parts and which is horizontally elongated in the direction of its rock arm, means arranged to resiliently resist movement of said seat part toward said base part, said seat and base parts being thereby linked together at each side independently of said tracks by said first and second pairs of rock arms through said first, second and third pivot means and which, in combination with the means rigidly connecting together each pair of rock arms at the track supported ends thereof, insures both fore-and-aft lateral stability of the seat part and also maintaining the same horizontal position of the seat part as it moves vertically toward and from said base part, and damping means comprising an arm pivoted on said one of said parts to swing about an axis generally parallel with said first axis, a roller and track connection between the free end of said lever arm and said other of said parts, a shock absorber having a cylinder part and a plunger part telescoping into said cylinder part, said shock absorber being arranged between said seat and base parts with its axis disposed horizontally and transversely of said first axis, means pivotally connecting one part of said shock absorber to a central part of said lever arm, and means rendering the other part of said shock absorber operative in response to movement of said means rigidly connecting said second pair of rock arms together.

3. A spring suspension for resiliently supporting a seat part upon a base part comprising, two yoke members disposed below the seat part, each having a cross member and a pair of arms rigidly connected to said cross member, the first of said yokes having its cross member slidably connected to the seat part and its arms pivotally connected to the base part, the second of said yokes having its cross member slidably connected to the base part and its arms positioned in a criss-cross relationship with the arms of said first yoke and pivotally connected to the seat part, said two yokes being pivotally connected to each other at the point of cross-over of their respective arms, a tubular member coaxially disposed with respect to the axis of the pivotal connection between one of said yoke members and one of said parts, and spring means comprising a torsion bar positioned substantially coaxially with said pivotal connection and housed within said tubular member, means operably connecting longitudinally spaced portions of said torsion bar to said one yoke and to said one part respectively to resiliently resist relative rotation of said parts, the coaxial relation of the torsion bar and said pivotal connection allowing full depression of the seat parts without interference.

4. A spring suspension for resiliently supporting a seat part upon a base part comprising, a yoke support member disposed below said seat having a cross member and a pair of arms rigidly connected adjacent to one end thereof to said cross member, said yoke having its cross member slidably connected to one of the parts and its arms pivotally connected to the other of said parts, two rock arm support members, each having one end slidably connected to said other of said parts and each having corresponding opposite ends pivotally connected to said one of said parts, one of said rock arms being in criss-cross relationship with one of said arms of said yoke and the second of said rock arms being in criss-cross relationship with the other of said arms of said yoke, said two rock arms being pivotally connected to said arms of said yoke at their points of cross-over, and torsion spring means positioned substantially along the axis of one of the three pairs of corresponding pivotal connections and secured at one end to one of said support members and said torsion spring means being anchored at another portion to operably bias the seat part away from said base part and resiliently resist movement between said two parts.

5. A spring suspension for resiliently supporting a seat part upon a base part comprising, two yoke members disposed below the seat part, each having a cross member and a pair of arms rigidly connected to said cross member, the first of said yokes having its cross member slidably connected to the seat part and its arms pivotally connected to the base part, the second of said yokes having its cross member slidably connected to the base part and its arms positioned in a criss-cross relationship with the arms of said first yoke and pivotally connected to the seat part, said two yokes being pivotally connected to each other at the point of cross-over of their respective arms, and torsion spring means positioned substantially along the axis of one of the three pairs of corresponding pivotal connections and secured at one end to one of said yoke members and said torsion spring means being anchored at another portion to operably bias the seat part away from the base part and resiliently resist movement between said two parts.

References Cited in the file of this patent

UNITED STATES PATENTS

| | | |
|---|---|---|
| 848,465 | Homeyer | Mar. 26, 1907 |
| 1,708,632 | Podiebrad | Apr. 9, 1929 |
| 1,734,776 | Pallenberg | Nov. 5, 1929 |
| 1,821,299 | Ferreira | Sept. 1, 1931 |
| 2,073,872 | Kliesbrath | Mar. 16, 1937 |
| 2,213,004 | Hickman | Aug. 27, 1940 |
| 2,618,682 | Thumin | Nov. 18, 1952 |
| 2,935,119 | Lie | May 3, 1960 |

FOREIGN PATENTS

| | | |
|---|---|---|
| 449,516 | Canada | June 29, 1948 |
| 502,047 | Canada | May 4, 1954 |